United States Patent [19]

Warfel

[11] Patent Number: 4,605,239

[45] Date of Patent: Aug. 12, 1986

[54] WHEELCHAIR TIRE AND WHEEL CLEANER

[76] Inventor: Jeff Warfel, 23 Lantern Cir., Spearfish, S. Dak. 57783

[21] Appl. No.: 622,748

[22] Filed: Jun. 20, 1984

[51] Int. Cl.$^4$ .............................................. B60S 1/68
[52] U.S. Cl. ................................. 280/158 R; 15/160; 15/246
[58] Field of Search ............... 15/160, 246, 256.5; 280/152 R, 154, 158 R, 289 R, 289 WC, 289 G; 16/41

[56] References Cited

U.S. PATENT DOCUMENTS

| 1,329,694 | 2/1920 | Beck | 15/246 X |
| 2,960,337 | 11/1960 | Johnson | 15/256.5 X |
| 3,231,293 | 1/1966 | Loustaunau | 15/256.5 X |

FOREIGN PATENT DOCUMENTS

| 385058 | 12/1932 | United Kingdom | 280/158 R |
| 2028485 | 3/1980 | United Kingdom | 280/289 R |

Primary Examiner—Edward L. Roberts
Attorney, Agent, or Firm—Fulwider, Patton, Rieber, Lee & Utecht

[57] ABSTRACT

Tire and wheel cleaner for cleaning the wheels of wheelchairs. A mounting bracket is attached to the frame of the wheelchair and holds a support arm in one of several user-selected positions. In one such position, a curved brush attached to the support arm is placed into contact with the large wheel of the wheelchair such that the wheel is cleaned as the wheelchair moves along.

6 Claims, 4 Drawing Figures

U.S. Patent    Aug. 12, 1986    4,605,239
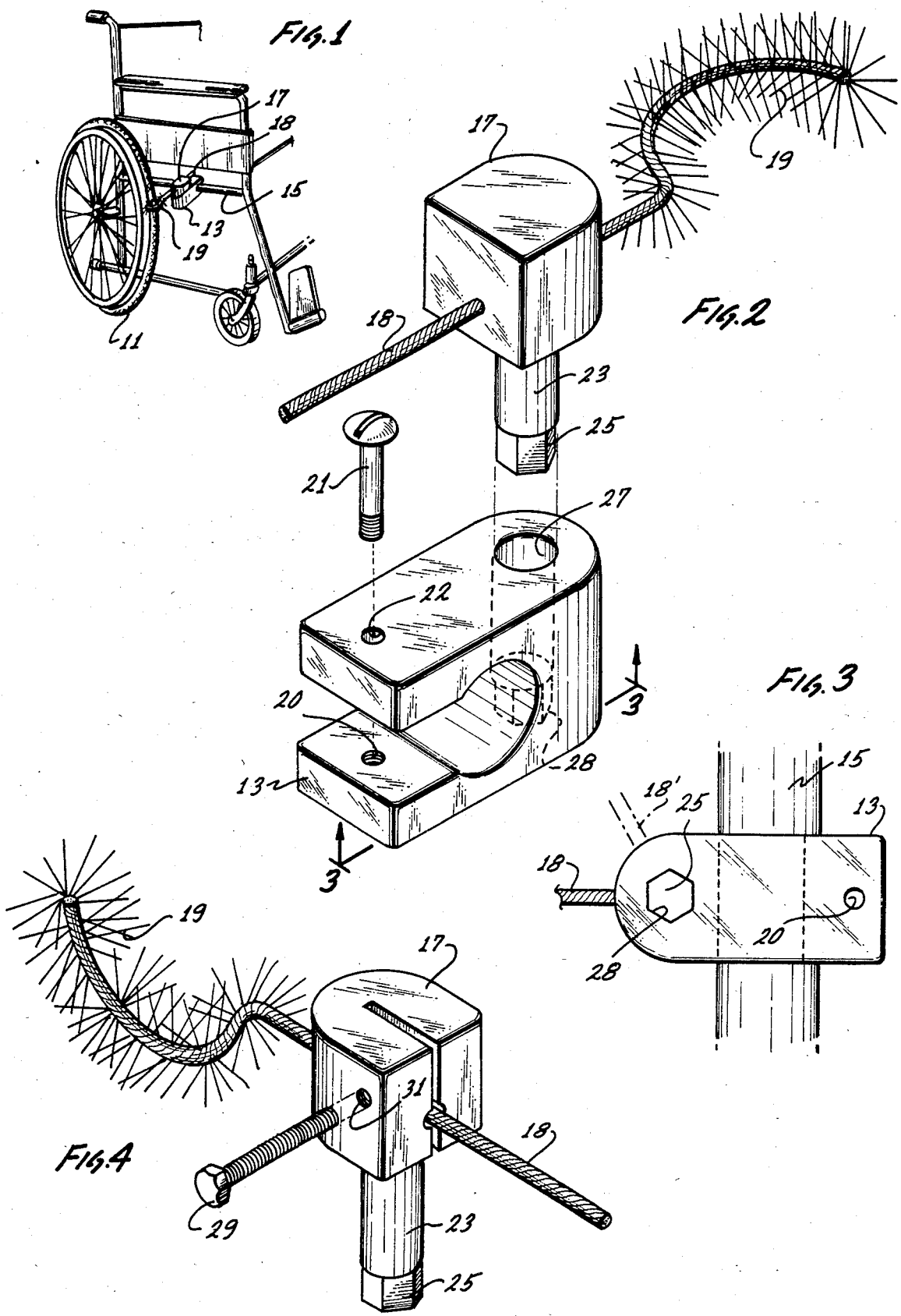

WHEELCHAIR TIRE AND WHEEL CLEANER

BACKGROUND OF THE INVENTION

This invention is in the general field of apparatus for removing dirt, and more particularly in the field of removing dirt from wheels and tires.

The wheelchair makes it possible for many handicapped persons to enjoy a mobility which they would otherwise be denied. However, wheelchairs also create new problems. One of these is the problem of tracking dirt indoors. For example, in the winter great amounts of snow and ice stick to the wheels and roll into the house, leaving a dripping wet trail. During the spring months the situation worsens since mud becomes embedded in the tread of the tires and then is deposited on the floor or in the carpet. When summer finally arrives and lawn moving begins, the wheels carry grass clippings and the like indoors.

Upon entering his or her home, or someone else's home or office, the wheelchair user must either clean the wheels (a task which frequently is physically impossible for the user to accomplish because of the handicap), or ask someone else to do it, or ignore the problem and allow whatever has been carried in on the wheels to soil the floor and carpet.

Thus there is a need for some way whereby the physically handicapped user of a wheelchair can clean the wheels of the wheelchair whenever he or she wishes to do so.

SUMMARY OF THE INVENTION

I have invented a way for the user of a wheelchair to clean the wheels without assistance from another person.

My invention comprises three basic parts: a mounting bracket, an adjustable support arm, and a specially shaped cleaning brush. One assembly of these parts is used to clean each wheel; hence, for a standard wheelchair, two such assemblies are required, one for each large wheel.

The mounting bracket is designed to clamp on to the wheelchair and can be clamped in many different positions or onto many different parts of the wheelchair. Thus, the bracket can be used on many different kinds of wheelchairs and can be positioned in various locations around the wheel, according to what is convenient for the particular user.

One end of the adjustable support arm fits into a matching receptacle in the mounting bracket. These two parts fit together in such a fashion that the adjustable support arm can be placed into any one of several different positions with respect to the mounting bracket. The other end of the adjustable support arm is attached to the brush.

The brush is of a curved shape with a radius of curvature such that it wraps around and brushes all three sides of the tire at the same time.

The user of the wheelchair can, with one hand, position the adjustable support arm such that the brush is in contact with the wheel. As the wheelchair moves along, the brush cleans the wheel. Then, when the wheel is clean, the user re-positions the support arm such that the brush is not in contact with the wheel. The support arm and brush assembly can be lifted out of the mounting bracket for cleaning when necessary.

Other objects and advantages of this invention will be apparent to those skilled in the art upon a consideration of the description and drawings herein.

BRIEF DESCRIPTION OF THE DRAWINGS

FIG. 1 shows my invention in place on a wheelchair.
FIG. 2 shows the various parts of my invention.
FIG. 3 is a bottom view from the perspective 3—3 in FIG. 2.
FIG. 4 is an alternate embodiment of the adjustable support arm.

DESCRIPTION OF THE PREFERRED EMBODIMENT

In FIG. 1, mounting bracket 13 is shown clamped onto bar 15, which bar is a part of the wheelchair. Adjustable support arm 17 has been positioned such that brush 19 is in contact with large wheel 11.

Referring now to FIG. 2, mounting bracket 13 is shown in detail. Bracket 13 is installed on a wheelchair by clamping it tightly by means of screw 21 which passes through hole 22 into threaded hole 20. Bracket 13 also has hole 27, the lower end of which has indexing sides 28.

Support arm 17 has shaft 23 with indexing sides 25. Shaft 23 is inserted into hole 27 and, when shaft 23 is all the way in, indexing sides 25 match with indexing sides 28 so as to hold arm 17 in position. The user can place arm 17 into a plurality of different positions by raising arm 17 such that shaft 23 comes part way out of hole 27, then rotating arm 17 to a different rotational position, then lowering arm 17 such that shaft 23 goes back in to hole 27. Indexing sides 25 then match with indexing sides 28 once again, holding arm 17 in position until it is again raised for repositioning.

Brush 19 is curved such that it wraps around the tire on the large wheel of a wheelchair, simultaneously brushing the tread and both sides of the tire. Shaft 18 of brush 19 is rigidly attached to arm 17 with suitable attaching means such as glue or a tight friction fit.

FIG. 3 shows the bottom of bracket 13. Bracket 13 is shown clamped onto bar 15. Shaft 18 is shown in one position, but by re-positioning support arm 17, shaft 18 can be moved into a plurality of different positions, one of which is shown as 18'.

FIG. 4 illustrates an alternate embodiment of arm 17, wherein brush 19 is clamped in place by screw 29 which fits into hole 31. In this embodiment, brush 19 can easily be removed for replacement when it is worn out.

It will be apparent that there are other attaching means which could be used to attach bracket 13 onto a wheelchair, and that there are other attaching means which could be used to attach brush 19 to arm 17. It will also be apparent that many different arrangements of indexing sides 25 and 28 could be used; for example, the indexing sides could be of a different shape or there could be a different number of them.

Having thusly described the invention, I claim:

1. Apparatus for cleaning rotating wheels, comprising:
   a U-shaped mounting bracket having a receptacle and also having tightening means for tightening the open ends of the "U" securely onto a support to which the mounting bracket is to be clamped;
   a support arm having a supporting extremity that fits within said receptacle;
   a brush tightly attached to said support arm; and indexing means to retain said support arm in one of a plurality of user-selectable rotational positions, wherein said indexing means comprises a plurality of flattened surfaces within said receptacle and on said supporting extremity of said supporting arm.

2. Apparatus for cleaning rotating wheels, comprising:
 a U-shaped mounting bracket having a receptacle and also having tightening means for tightening the open ends of the "U" securely onto a support to which the mounting bracket is to be clamped;
 a support arm having a first extremity that fits within said receptacle, the support arm also having a second extremity that is partially split into parallel ends;
 means for tightening the parallel ends of the split second extremity together; and
 a brush having a shaft that is clamped in position between the parallel ends of said support arm.

3. Apparatus according to claim 2, comprising in addition indexing means to retain said support arm in one of a plurality of user-selectable rotational positions.

4. Apparatus according to claim 3, wherein said indexing means comprises a plurality of flattened surfaces within said receptacle and on said first extremity of said supporting arm.

5. Apparatus for removing dirt from a wheel that rotates about an axis, the apparatus comprising:

a bracket for mounting adjacent the wheel in fixed relationship to the axis, the bracket having therein a receptacle surrounded and defined by the body of the bracket, the receptacle opening outwardly of the body of the bracket along a receptacle axis;
 a support arm having an extremity defining an extremity axis, the extremity being adapted to fit within the receptacle with the extremity axis and the receptacle axis in coaxial relation for locating the extremity in either of two predetermined orientations around said axes for locating the support arm in first and second positions, respectively;
 a brush affixed to the support arm, the brush being operative to remove dirt from the wheel as the wheel rotates when the support arm is positioned in the first position and inoperative to remove dirt from the wheel when the support arm is positioned in the second position; and
 means for retaining the support arm in a selected one of said positions.

6. Apparatus according to claim 5 wherein the means for retaining the support arm in either of said positions comprises complemental flats in the receptacle and on the support arm extremity, respectively, the flats being complementally engageable to retain the extremity of the support arm in either of the predetermined orientations within the receptacle.

* * * * *